Feb. 9, 1965  S. R. JOHNSON  3,168,799
TOOL FOR POLISHING PIPE FITTINGS AND THE LIKE
Filed April 23, 1963

INVENTOR.
SANDERS R. JOHNSON
BY
Blair & Buckles
ATTORNEYS

United States Patent Office 3,168,799
Patented Feb. 9, 1965

3,168,799
TOOL FOR POLISHING PIPE FITTINGS
AND THE LIKE
Sanders R. Johnson, Lakehurst, Windham, Maine
Filed Apr. 23, 1963, Ser. No. 275,016
6 Claims. (Cl. 51—392)

This invention relates to the preparation of tubular fittings for solder jointing, and more particularly to method and apparatus for polishing and grinding the telescoping and surfaces of annular tubing and fittings preparatory to their uniting in a solder joint.

The polishing and grinding of the inside and outside surfaces of the mating or male and female parts of tubes and other annular fittings to be coupled or united in a solder joint, as with the copper tubing and fittings of plumbing, heating and allied systems, has heretofore been an inefficient, laborious and uncertain hand operation. It is performed on tubing and fittings which, as manufactured, or as they may have been cut to length or otherwise handled in the field, are subject to chemical impurities and various contaminants, and also to scoring, burrs, end ridge expansions and the like physical deformities.

The proper preparation of these parts requires first that they be made perfectly clean, since the solder will not adhere to a dirty surface. Also, the mating elements of the joint must be perfectly matched, with each being accurately finished to the specified dimension, for the desired rigid tight interfittitng of the parts, and complete sealing by capillary action of the solder.

The conventional hand method of carrying out this tube and fitting joint preparation, which is the one in use ever since the introduction of solder type copper tubings and fittings, more than 30 years ago, is subject to numerous difficulties and disadvantages. The hand polishing of the inside or female member surfaces is in many cases made difficult by reason of their small size, which is typically ⅜" or ½" I.D., or too small to admit of the insertion of the sand cloth by the hand or even a finger. The use in lieu thereof of a pencil, screw driver or the like has been attempted, but has proven an unsatisfactory expedient, in that such a tool is not shaped conformantly to and will not properly guide the sand cloth to the work, in that the tool is commonly dirty or greasy and so contaminates the sand cloth and hence the work, and in that it loses to the operator his control by "feel" of the polishing and grinding action.

Again, the elevated or otherwise inaccessible location of some fittings has made it difficult to check whether, or establish visually that, the polishing has been complete and uniform.

There is also the problem of overpolishing; the joint surfaces are susceptible of being polished or ground excessively, or more particularly to open up an overlarge clearance between the parts, and thereby prevent their suitably close or tight interfitting.

The attempted conditioning or joint parts separated for re-use has also been troublesome heretofore, due to the fact that the reheating and hand wiping of the parts has left them with high spots and also slicks of surplus solder, these combining to obstruct the inserting of the tube fully into the fitting, and thereby to prevent the desired full tight joining of the parts.

Yet another prior art difficulty arises from the common practice of applying the solder paste with the finger, and then allowing that greasy substance to be deposited on the sand cloth, whereby the cloth is prevented from cleaning the surfaces in ensuing polishing operations.

An object of this invention is to provide a method of conditioning solder type fitttings to give them a clean finish for complete solder adhesion, and to dimension them to standard specifications for perfect matching, in the solder joint.

Another object of the invention is to provide a tool for polishing and grinding the mating end surfaces of tubes and tubular fittings in quick, easy, uniform, and precise manner and to effect a complete cleaning and standard dimensioning of the tube and fitting ends preparatory to their solder jointing.

A further invention object is the elimination of the risk of overpolishing the fitttings, in preparing them for solder jointing.

Yet another invention object is the provision of method and means for finishing or grinding the mating end surfaces of telescoping members to perfectly match or interfit both in taper and in dimension, whereby they may be assembled and sealed in a fully tight joint.

Yet another object of the invention is the provision of method and means for efficiently and uniformly polishing tube fittings which are difficult to reach or enter, without the necessity of visually observing or manually contacting the cleaned surface.

A still further invention object is the provision of a method and means for reconditioning previously soldered tube and fitting ends for re-jointing, characterized by the elimination of heretofore necessary heating and wiping steps, and by removal of heretofore troublesome metal high spots and surplus solder slicks.

The invention will be better understood from a consideration of the following description taken in connection with the accompanying drawings in which.

In the illustrated embodiment the invention tool comprises a hub 10, which may be a ring or tube segment, mounting a number of shafts or arms 11 extending radially therefrom in a common plane. The arms 11 are uniformly distributed in a spoke like arrangement about the hub, and may as herein be disposed in coaxial, oppositely extending pairs.

Figure 1:
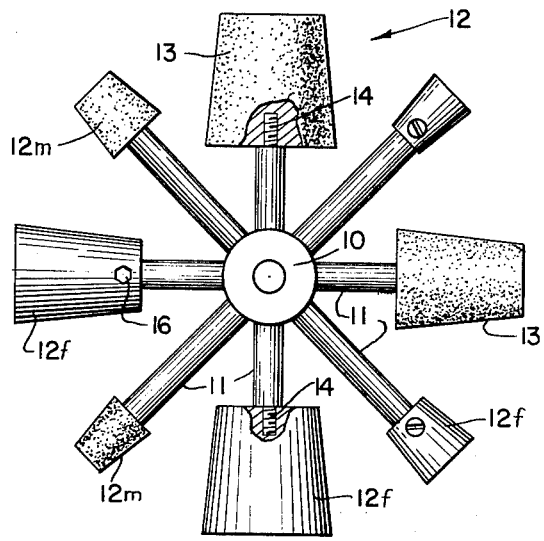
FIG. 1 shows one embodiment of the invention tool.
Figure 2:
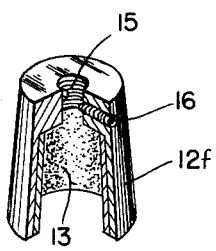
FIGS. 2 and 3 are cut-away views in perspective of adaptor mounts or base elements of the tool.
Figure 3:
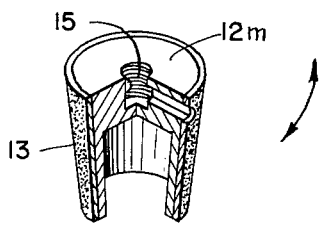

Fixed to the ends of arms 11 are a like number of adaptor supporting mounts or bases 12, all having the configuration of a frustum of a cone and a taper of, say 0.002" over their tube conditioning length. The adaptor bases 12 are further defined as of male and female forms, the male bases 12m having outside work engaging surfaces, and the female bases 12f being recessed to present inside work engaging surfaces. For lighter weight and easier handling of the tool, the male bases 12m are interiorly recessed, FIG. 3, to put them in balance with the female bases 12f, FIG. 2.

In accordance with the invention, the male and female bases 12m, 12f are formed at their active or work engaging surfaces with the same slope or taper, and in various dimensions selected as appropriate to the various standard tube and fitting sizes, such as ⅜", ½", ¾", etc. The bases 12 are selected or arranged in pairs, as herein on opposite arms 11, to provide for working or conditioning both the male and female elements of the various tube and fitting assemblies for which the tool is designed. The bases 12 of any given male and female pair, then, are formed with similar but opposite taper and to the same dimension whereby they, and tube fittings conforming to them, will, if telescoped together, perfectly match in a completely tight union.

The arranging of the bases 12, and in addition the proportioning lengthwise of the arms 11, is seen also as generally to alternate larger and smaller base sizes, to afford maximum spacing of the bases within the limits of an overall dimension as appropriate for hand manipulation of the tool, and to position the base outer ends at approximately a common perimeter or radial distance from the hub 10.

Further in accordance with the invention, the mounts or bases 12 receive or provide at their work engaging surfaces polishing and grinding means or adaptors 13. The polishing adaptors 13 may as herein be abrasive cones or sleeves formed from sand cloth or the like, and which are spot glued or otherwise firmly but removably secured to the bases 12.

The invention means or adaptors 13, for the finish grinding and polishing of the work may alternatively comprise a metal mesh, which may have the fineness of, say, a No. 2 file designation, and be formed in the surfaces of the adaptor mount or base elements themselves. For this purpose the bases will in turn be formed with at least a skin or surface of steel or the like material of greater hardness than the usually copper or copper alloy metal of which the tube fitting is formed.

The invention tool may generally in its hub 10, arms 11, and bases 12, be constructed of steel, brass, or other metallic or similarly rigid material.

It will be understood that the invention tool may be constructed with various numbers of arms 11 and arrangement of bases 12, that herein shown, comprising four pairs of arms with each pair mounting a matching set of male and female bases, being merely illustrative.

The invention tool is desirably integrally formed of a durable light weight material which can be easily cast or molded, such as a material of steel or brass composition, or a molded plastic material, for example, X-celite. Under the invention the bases 12 may alternatively be removably joined to the arms, as herein by threaded stems 14 and bores 15, to allow selection or substitution of bases of different desired sizes for use with different desired numbers and combinations of sizes of tubes, fittings, valves and the like. Where removably mounted the bases may be fitted also with locking means such as a screw 16, FIG. 2, for releasably securing the bases in mounted position.

Figure 5:
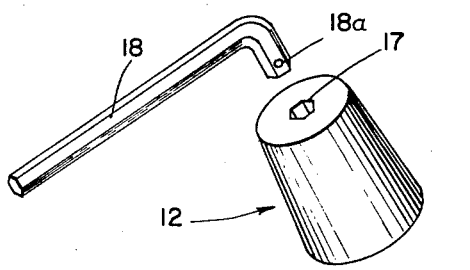
FIG. 5 illustrates how the base elements may be engaged by a key or wrench for rotative manipulation.

In accordance with the invention the adapter base 12 may be variously fitted for the rotative manipulation, as with a hexagonal or other non-round socket 17, FIG. 5, whereby it may be engaged for the purpose by a conventional key or wrench 18 having the usual spring biased ball detent or keeper 18a.

Figure 4:
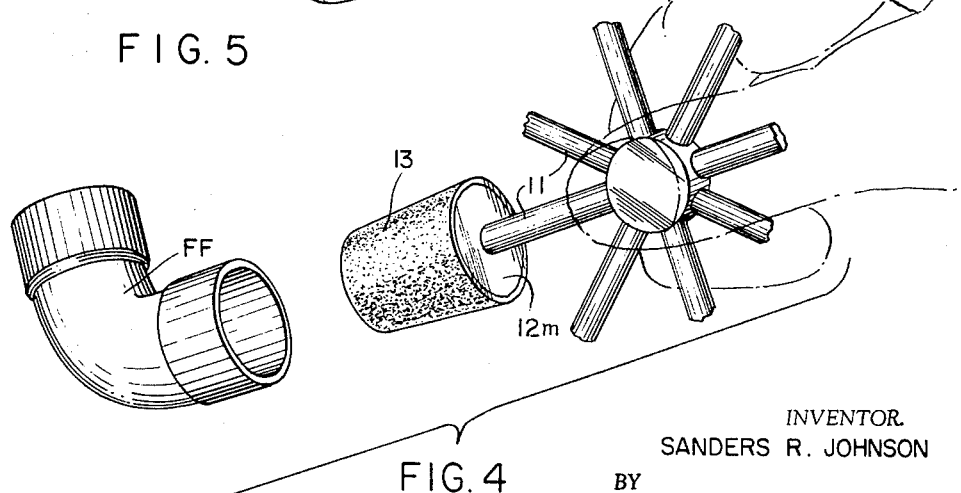
FIG. 4 illustrates the use of the tool in the practice of the invention method.

In the operation of the tool, as illustrated in FIG. 4, the operator simply grasps the opposite faces of the tool between the thumb and fingers and applies the tool to the work, engaging the appropriate adaptor base inside or outside the end of the tube or fitting, as exemplified in FIG. 4 by a male base 12m to be inserted in a female member of fitting FF of the joint or coupling. The operator will then, by twisting his wrist, rotate the tool back and forth in an oscillatory movement while urging or pressing the tool against the work.

The described operation or manipulation may be done by an unskilled person and in but a few seconds, and yet always to completely and accurately condition the work for soldering. More particularly, with but a few twists of the wrist, the tube and fittings will be fully polished, freeing them of dirt and other surface contaminants, and will also be fully ground, ridding them of cuts, burrs, and the like and also finish-forming them to uniform taper and dimension.

Then when the mating male and female tube and fitting ends which have been conditioned in accordance with the invention method are telescoped together and soldered in the usual way, there is assured a prefectly matched, fully sealed and firmly bonded joint.

Those skilled in the art will appreciate that the method and means of this invention will effect significant labor savings in the preparation of tube fittings in solder jointing, eliminating up to as much as an hour a day heretofore expended by the plumbing installer in laborious sanding or polishing by hand of the fittings. Further economies are realized, it will be understood, by the eliminating of the leak stopping and other repair work heretofore necessitated by imperfect soldering of the fittings. And still further gains are had in the preparation of used fittings for re-jointing, through the elimination of the heretofore necessary heating and wiping of the fittings, the rotative manipulation of the invention tool serving itself to remove the high spots in the metal, and any surplus solder slicks on the joint surfaces.

From the foregoing it will also be understood that this invention tool eliminates the risk of overpolishing, being incapable of excessive grinding of the fittings.

It is also to be understood that the following claims are intended to cover all of the generic and specific features of the invention, which as a matter of language might be said to fall therebetween.

I claim:

1. A tool for finishing and polishing the mating end surfaces of tubular fittings in quick easy uniform and precise manner and to effect a complete cleaning and standard dimensioning of and without risk of overpolishing said fittings preparatory to their solder jointing, comprising a rigid hub, a plurality of pairs of rigid arms mounted to extend radially of said hub, tapering annular bases carried by said radial arms, said bases formed as frustums of cones, oppositely extending pairs of said arms carrying male and female bases, said male and female bases presenting outside and inside work engaging surfaces variously dimensioned and uniformly tapered to standard specifications, the tube conditioning length and the taper of said bases being such that in the various standard sizes the taper of said bases is uniformly about 0.002 inch over said tube conditioning length, and polishing adaptor means carried on said base surfaces whereby upon the rotative application to said end surfaces of the appropriate bases of said tool said end surfaces are completely cleaned, fully polished, uniformly tapered, and standard dimensioned for matched interfitting and tight solder jointing of said tubular fittings.

2. A tool according to claim 1, wherein said bases are alternated in larger and smaller sizes on said arms and also the arms are proportioned lengthwise to afford maximum spacing of the bases within the limits of an overall dimension as appropriate for hand manipulation of the tool and to position the base outer ends at approximately a common radial distance from the hub.

3. A tool according to claim 1 and having on oppositely extending pairs of arms male and female bases of matching dimensions and similar but opposite taper.

4. A tool according to claim 1, wherein said polishing adaptor means comprise sand cloth cones bonded to the base surfaces.

5. A tool according to claim 1, wherein said polishing adaptor means comprise hard metal mesh integrally formed on the base surface.

6. A tool according to claim 1 wherein said bases are removably engaged to said arms by threaded stems and bores whereby bases of different desired sizes may be mounted on said arms for use with different desired numbers and combinations of sizes of said tubular fittings, and locking means for releasably securing the said bases in mounted position.

References Cited by the Examiner

UNITED STATES PATENTS

| 2,167,311 | 7/39 | Postma | 51—289 |
| 2,314,533 | 3/43 | Wallace | 51—289 |
| 2,383,464 | 8/45 | Bown | 51—206 |
| 2,892,292 | 6/59 | Whitney | 51—190 |
| 3,027,692 | 4/62 | Field | 51—190 |

FOREIGN PATENTS 169,506    4/51    Austria.

LESTER M. SWINGLE, *Primary Examiner.*